United States Patent Office 2,898,387
Patented Aug. 4, 1959

2,898,387

PROCESS FOR THE HYDROGENATION OF HYDROCARBONS

John W. Teter, Chicago, Ill., assignor to Sinclair Refining Company, New York, N.Y., a corporation of Maine No Drawing. Application July 29, 1955
Serial No. 525,373

11 Claims. (Cl. 260—667)

This invention relates to the hydrogenation of unsaturated compounds through the use of a defined platinum-alumina catalyst in the hydrogenation reaction. In one particular aspect, the invention is concerned with the production of cyclohexane and ethyl cyclohexane by hydrogenation of benzene and ethylbenzene, respectively, over the platinum-alumina catalyst. Also, this invention relates to a combined procedural operation for manufacturing cyclohexane by reforming a selected $C_6$ petroleum fraction under conditions to produce a benzene-rich fraction and then hydrogenating separated benzene.

In any operation for hydrogenating unsaturated compounds, the selection of a suitable catalyst is of the utmost significance. The catalyst must not only afford a relatively fast reaction rate to produce good yields of the hydrogenated product, but in addition it must be selective and not initiate unwanted side reactions resulting in undesirable products. For instance, in producing cyclohexane from benzene, isomerization of the cyclohexane to methyl cyclopentane should be at a minimum to produce commercial grade cyclohexane of over 95% purity. It has now been found that the platinum-alumina catalyst of application Serial No. 288,058, filed May 15, 1952, now abandoned and its continuation-in-part application, Serial No. 489,726, filed February 21, 1955, now Patent No. 2,838,444, is effective in catalyzing the conventional hydrogenation reactions to give selectively good yields of the hydrogenated product. This catalyst contains about 0.1 to about 1.0% of platinum in finely dispersed form on an alumina base which is derived from a precursor alumina hydrate composition which predominates in the trihydrate form of alumina. Usually about 65 to about 95 weight percent of the precursor hydrate is trihydrate comprising one or more of the gibbsite, bayerite and randomite forms as defined by X-ray diffraction analysis. The substantial balance is amorphous or monohydrate-type alumina. The trihydrates are present as well-defined crystallites, that is, they are crystalline in form when examined by X-ray diffraction means. The calcined catalyst is characterized by a large surface area ranging from about 350 to about 550 or more square meters per gram in the virgin state as determined for example by the BET adsorption technique. The calcined catalyst also has a large portion of its pore volume in the pore size range of about 100 to 1000 angstrom units, generally having about 0.1 to about 0.5 and preferably about 0.15 to about 0.3 cc. per gram of pore volume in this range. The crystallite size of the precursor alumina trihydrate also is relatively large and usually is in the 100 to 1000 angstrom unit range.

The reaction conditions which are observed in conducting the hydrogenation of the present invention can vary over wide ranges and still produce acceptable yields of hydrogenated products at desirable reaction rates. Generally, the reaction temperatures can vary from room temperature up to 750° F. or even more, while pressures can range from atmospheric up to 1000 pounds or more. Elevated temperatures and pressures are preferred and particularly temperatures of about 100° F. to 700° F. and pressures of about 100 to 500 p.s.i.g. are effective. Sufficient hydrogen must be present in the reaction zone to satisfy the unsaturation of the compound being hydrogenated, and usually an excess of hydrogen will be used in order to insure complete hydrogenation. In general the ratio of hydrogen to hydrogenatable material charged to the reaction zone will vary from about 2 to 15 moles of hydrogen per mole of the material.

It is particularly advantageous to select reaction conditions which afford a vapor phase reaction since condensation of water vapor and hydrocarbon reactant tends to plug the catalyst. Also, the vapor reaction affords greater reaction rates and better processing control. The vapor phase reaction diminishes sulfur poisoning of the catalyst as the present catalyst has long life even at very high sulfur feed levels.

In hydrogenating benzene to cyclohexane and ethyl benzene to ethyl cyclohexane, it is very advantageous from a commercial standpoint to produce high purity products, that is of at least about 99% purity (based on pure feed) at economical reaction rates. In order to reach this result in producing cyclohexane, isomerization of the cyclohexane product to methylcyclopentane must be negligible if not completely absent. Reactions of this desired selectivity are not common, but the catalyst of the present invention unexpectedly provides the desired selectivity at satisfactory reaction rates under given reaction conditions. These conditions are vapor phase operations which include temperatures of about 350 to 700° F., pressures of about 100 to 500 p.s.i.a., and hydrocarbon weight hourly space velocities of about 0.5 to 20 parts per part of catalyst. A ratio of about 5 to 15 moles of hydrogen per mole of hydrocarbon feed is generally utilized but at least sufficient hydrogen to effect the reaction must be present. For given partial pressures of hydrogen and hydrocarbon, the temperature must be high enough to avoid excessive physical adsorption of hydrocarbons on the catalyst but low enough so that the desired conversion is thermodynamically possible. In hydrogenating benzene to cyclohexane the preferred reaction conditions include temperatures of 450 to 550° F., pressures of 100 to 300 p.s.i.a., hydrogen to hydrocarbon molar ratio of 5 to 15:1, and hydrocarbon weight hourly space velocities of 3 to 10 parts per part of catalyst.

As noted, the defined platinum-alumina catalyst is effective in the conventional hydrogenation reactions, for instance, in converting aromatics to the corresponding naphthenes. These aromatics can be mononuclear or polynuclear and substituted or unsubstituted. Particularly, benzene or alkylated benzenes are effectively hydrogenated to the corresponding naphthenes. For instance, benzene is converted to cyclohexane, ethyl benzene yields ethyl cyclohexane and toluene produces methyl cyclohexane, etc. Of course the catalyst can be employed to convert any of the usual unsaturated hydrogenatable materials such as olefins, unsaturated polar compounds such as acids and nitrogen-containing compounds, ketones, aldehydes, etc. The hydrogenation reaction can be conducted on a batchwise, as in a fluidized bed of catalyst, or on a continuous basis according to the choice of the operator. In any continuous operation unreacted hydrogenatable material in the effluent from the reaction zone, for instance, that produced when operated at reduced conversion levels per pass, can be separated and recycled to the principal reaction.

It has been found particularly desirable to produce cyclohexane by the combined procedural operation which includes reforming in the presence of hydrogen a selected heart cut $C_6$ petroleum hydrocarbon fraction containing a substantial amount of naphthenes, for instance, over a platinum-alumina catalyst to produce a benzene-rich fraction and then hydrogenating the benzene under the specific conditions previously noted as being advantageous in producing high purity cyclohexane. The selected $C_6$ petroleum fraction generally boils at a temperature from about 130° to 180° F. and is composed principally of $C_6$ and $C_7$ paraffins, $C_6$ and $C_7$ naphthenes, and benzene. The conditions in the reforming step must be such as to produce a benzene-rich reformate. In such a reaction the naphthenes present in the feed stage are either converted to benzene or hydrocracked to $C_6$ and lighter paraffin compounds while the paraffins, e.g. n-hexane, are either dehydrocyclized to benzene or hydrocracked. Of course, the benzene present in the charge remains unchanged. The more severe the reforming reaction the richer is the resulting product in benzene. Thus under mild conditions the benzene may have to be concentrated before hydrogenation. It is possible to reform under sufficient severity that the resulting product can be charged directly to the hydrogenation reaction without conducting a benzene concentrating operation; however, fractionation to separate the desired materials will generally be necessary either before or after the hydrogenation.

The catalyst utilized in the reforming stage of the combined operation is preferably the platinum-alumina catalyst of the type disclosed in applications Serial Nos. 288,058 and 489,726. In such cases the catalysts utilized in both stages of the combined operation are similar, and any plant constructed to effect the two-stage combined operation will afford flexibilities which can account for variations in the over-all economic picture.

The conditions observed in converting the selected $C_6$ heart cut to the desired benzene-rich fraction are in general defined as high severity reforming conditions. Thus, the inlet temperatures observed can vary from about 875° to 975° F., and the pressure can vary from about 100 to 500 p.s.i.g. The hydrogen contacting the charge in the reformer which may be produced wholly or partly by the reforming reaction will normally vary from about 2 to 15 moles of hydrogen per mole of hydrocarbon feed. The feed passes to the reactor at hydrocarbon weight hourly space velocities from about 0.5 to 20 based on the total reactor feed. The benzene-containing effluent from the reforming operation can be handled in a number of ways. First, benzene is separated from this effluent, for instance, by a simple fractionation or solvent extraction, and all or a part is passed to the subsequent hydrogenation reaction to produce cyclohexane. Any benzene not passed to the hydrogenation reactor can be further treated to produce nitration grade benzene and utilized or sold as such.

Through the combined procedure yields of cyclohexane from the selected petroleum fraction are good. For instance, conversion of $C_6$ naphthenes to benzene was about 84% complete for the 200 p.s.i.g. reactions and about 91% complete in the 50 p.s.i.g. runs. Separations of the benzene-rich fraction from the reforming rerun tower or cyclohexane from the hydrogenation unit can be easily achieved. This result is accomplished because $C_7$ paraffins particularly 2,4-dimethyl-pentane normally boiling in the cyclohexane and benzene range are removed by either hydrocracking or dehydrocyclization to toluene in the reforming step. Also, desulfurization occurred during the reforming stage, e.g. at 200 p.s.i.g., and the sulfur content decreased from .052 to .008 weight percent. Desulfurization of approximately 89 weight percent was accomplished in the 50 p.s.i.g. runs, and the catalyst of applications Serial Nos. 288,058 and 489,726 seems insensitive to sulfur poisoning under hydrogenating conditions.

Thus, it is seen that this combined operation affords a convenient and economic procedure for producing cyclohexane from a selected $C_6$ petroleum fraction. Aside from the features noted, this operation is found advantageous in that the initial or reforming stage may be conducted under conditions so that at least a portion of the hydrogen required in the hydrogenation reaction can be produced directly in the reforming stage. Further, by operation of the reforming stage at or above the pressure observed in the hydrogenation reaction, the hydrogen produced in the initial stage can be passed to the hydrogenation stage without further compression normally necessary to obtain pressurized hydrogen for the hydrogenation reaction when it is not effected in combination with the reforming operation.

In preparing the catalyst of applications Serial Nos. 288,058 and 489,726 the alumina hydrogel may be formed for example by precipitating the gelatinous hydrous oxide from a solution of a soluble aluminum salt such as aluminum chloride. Other soluble sources of aluminum can be employed, for example aluminum sulfate or sodium aluminate, although subsequent removal of sulfate ion, for example, by washing may occasion more difficulty than chloride ion. Ammonium hydroxide is a useful agent for precipitation of the alumina hydrogel from the salt solution. In the gel-forming step pH control is important in obtaining a good rate of conversion, and it is desirable to maintain a pH between about 7 to about 10. For instance, if the pH be too low, the conversion to trihydrate may be inhibited. As an incident to the gel-forming step, extraneous ions introduced in preparation such as chloride ion are removed by washing with water. For example, it is usually desirable to reduce chloride ion to a concentration of less than about 0.2%.

The conversion of the alumina hydrogel to the desired precursor alumina system may be effected in various ways as by aging the hydrogel which is maintained at a pH of about 7 to about 10 for a period of several days or as by seeding the hydrogel in the preparation process with crystallites of gibbsite, for example. The transition to the desired phase system predominating in the crystalline trihydrate forms of alumina may be roughly controlled with experience by visual observation. The translucent hydrogel takes on a decidedly whiter and more opaque appearance as the crystalline forms grow and cause light scattering. However, it is desirable to control the transition by sampling, drying the sample to say about 110° C. and determining the distribution of hydrate phases by the technique of X-ray diffraction analysis. Pore volume determinations and surface area measurements as by the BET method are also useful. By this means, the preparation procedure with given materials, operating techniques and equipment may be standardized and then may be controlled as seems necessary with spot analytical checks.

The platinum may be incorporated into the alumina base by adding an aqueous solution of chloroplatinic acid, for example, to the precursor alumina composition followed by precipitation in situ by aqueous hydrogen sulfide solution or by gaseous hydrogen sulfide. Another method of platinum incorporation is to admix a platinum sulfide sol of desired concentration with the precursor alumina composition. The resulting slurry in any case is dried, and preferably, the drying operation is conducted rapidly. For example, the drying should be completed in not more than about 24 hours at about a pH of 6 to 9. Various expedients may be applied to accelerate drying by exercising appropriate precautions. For example, the mixture may be dried using a rotary drum type drier, or it may be pre-filtered to reduce water content and chloride content prior to drying in an oven, or it may be dried using a drum drier after reslurrying, or it may be spray dried. If desired, the platinum may be incorporated into the aged hydrate base after the base has been dried. Alternatively, the aged hydrate base may be impregnated with platinum after drying and partial to complete removal of water of crystallization. However, an advantageous method is that which includes impregnation of the base before drying.

The dried alumina catalyst mixture than may be formed by a tableting or extruding operation. If the catalyst is to be in finely divided form, the grinding operation may follow calcination. In the case of tableting it is customary to incorporate a die lubricant which advantageously is organic and can be burned out by oxidation in the calcination step. The calcination is effected by burning with an oxygen-containing gas, e.g. by heating the catalyst in the presence of the flowing gas stream at a temperature of about 750° to about 1100° F. for a period of 6 hours. Higher temperatures, e.g. 1200° F., may be employed but the calcination should not be continued to the point of undue catalyst sintering. The calcination can be initiated with a mixture of air and nitrogen and completed with air. When calcining extruded catalyst containing no organic material the use of nitrogen is not necessary. Before use the catalyst can be reduced by subjecting it to contact with flowing hydrogen at a similar temperature and for a period of several hours, e.g. 900° F. and atmospheric pressure for about 1 to about 12 hours. The calcined catalyst contains generally upwards of about 2% by weight of matter volatile at 1100° C. and if calcined at 900° F. with dry air and cooled with dry air, such volatile matter constitutes from about 2 to about 5% of the weight of the catalyst.

The catalyst compositions contain about 0.1 to about 1 weight percent platinum. The form in which the platinum metal is present is not certain except that it is not detectable by X-ray diffraction methods. Thus, if the platinum metal be present as metal crystallites the fact that they are not detectable by X-ray diffraction methods indicates crystallite sizes of less than about 50 angstrom units. Excess platinum metal in forms detectable or undetectable by X-ray diffraction techniques may be present but has not been found to provide any advantage justifying the expense. Also as noted above, the catalysts are characterized by the existence of the alumina base as a mixture of modifications of gamma alumina which correspond to and derive from a precursor base composition in the uncalcined catalyst of alumina hydrate phases which predominate in the crystalline trihydrate form. By this it is meant that the percentage of alumina in the form of trihydrates must exceed 50% and preferably approximates about 65 to about 95% by weight of the total alumina hydrate composition. The trihydrates present may be gibbsite, bayerite and randomite, the last of which appears to be a trihydrate of crystalline form intermediate the structure of gibbsite and bayerite. It has also been observed that it is essential to provide in the precursor phases either by separate addition or by control of the hydrate aging at least about 5% and preferably about 10 to about 35% by weight of the alumina monohydrate [(AlO)OH] or amorphous hydrous alumina or their mixture.

The catalysts made from aluminas containing high percentages of the trihydrates in the precursor alumina mixtures have considerable pore volume in the 100 to 1000 angstrom units pore size range. For example, pore volume distributions determined as a result of nitrogen adsorption-desorption isotherm methods and analysis show that these catalysts generally have about 0.10 to about 0.5 and preferably about 0.15 to about 0.3 cc./gram of their pore volume, which corresponds to about one-half the total pore volume, in pores greater than about 100 angstrom units pore size. In the distribution of pore sizes below about 100 angstrom units, there appears to be little difference that can be correlated with catalytic properties.

The large pores may be formed from the trihydrates because of the fact that the trihydrates in the uncalcined state are indicated by X-ray diffraction as crystalline materials of about one hundred to about one thousand angstrom units crystalline size. These large pores are not formed during calcination but actually exist in the uncalcined alumina. The large pores do not exist in alumina bases derived from the boehmite or monohydrate form of precursor alumina, either before or after calcination. The boehmite type of precursor alumina is characterized by small crystallite size of the order of 40 angstrom units before and after calcination and contains substantially no pores larger than 50 angstrom units. It appears however that the presence of a minor proportion of the boehmite form or the amorphous hydrous alumina or their mixture in the precursor mixture is advantageous to insuring maximum retention of large pore volume in addition to the normal fine-pore structure during catalyst preparation. Thus these catalysts characterized by the larger pore volumes contain about 5 to about 35 weight percent of boehmite or amorphous hydrous alumina or their mixture in the precursor mixture.

In addition to pore size and pore volume distribution, the nature of the precursor aluminas influences the ultimate structure and state of the catalyst in other ways that appear to be significant with respect to catalyst performance. Where the monohydrate has crystallite sizes of about 30 to 40 angstrom units and relatively high surface area, e.g. about 300 square meters per gram determined by nitrogen adsorption methods, the crystallite sizes in the uncalcined trihydrate mixture seem to range largely from about 300 to about 1000 angstrom units and the surface area approximates only about 60 to about 250 square meters per gram. After calcination of the trihydrate, the alumina crystallite sizes predominantly seem to fall in the range of about 35 to about 65 angstrom units and the surface area ranges from about 350 to about 550 or somewhat more square meters per gram. If the catalyst base be calcined before platinum impregnation, the area may be somewhat less than about 350 square meters per gram. This situation, i.e. the increase of surface area when the alumina trihydrate is calcined may have an important influence on the ultimate state of dispersion and the crystallite size of the platinum in the catalyst. Considered together the average crystallite size of the trihydrate phases, determined dry before calcination, and the pore volume distribution after calcination may be an indication of base structure accessibility related to catalyst activity and stability.

It has also been observed by X-ray diffraction studies that the platinum which is effective in these catalysts is not detectable by X-ray diffraction studies and thus does not appear as definite lines. Thus, the effective platinum is in sufficiently finely divided form as to exhibit by X-ray diffraction studies, the substantial absence of crystallites and crystals of size larger than about 50 angstrom units. A surprising property of the finely dispersed platinum is that it is dissolved to a substantial extent in strong sulfuric acid. This observation suggests that the active platinum may be in some combined form rather than in the form of metallic platinum. These catalysts may be promoted by addition of halogens such as fluorine and chlorine. Also, other metals of the platinum group can be used instead of platinum, e.g. rhodium, ruthenium, palladium, osmium and iridium.

Typically the catalyst is prepared according to the following procedure.

CATALYST PREPARATION

A. *Description of alumina hydrate base*

The base for this catalyst, 400-E-9757, was an alumina hydrate which was 71 days old. The composition of the dried hydrate (by X-ray diffraction) was: 29% gibbsite, 42% bayerite, 22% randomite, 6% boehmite and traces of amorphous. The crystallite size of the trihydrate phases appeared to be small.

The base was prepared by adding 1 NH₄OH:1 H₂O to a solution of vigorously stirred AlCl₃6H₂O (1# of $$AlCl_3.6H_2O/2\ l.$$

of deionized water) until the pH equaled 8.0. The hydrate was filtered from the mother liquor and washed to 0.27% Cl (by filter press washing procedure). Reslurries were made using approximately 3 gal. of deionized H₂O/lb. of Al₂O₃ and the pH of the slurries was adjusted to 8.0 (first re-slurry), 9.0, 8.5 and 8.5 (fourth re-slurry). The washed hydrate was aged as a filter cake.

B. Impregnation of alumina hydrate base 2 l. of alumina hydrate slurry (containing 123 g. Al₂O₃/l.) was placed in a 3 gal. stoneware jar and stirred vigorously for 30 minutes to effect thorough dispersion. With continued stirring, a platinum solution consisting of 34.3 ml. of H₂PtCl₆ solution (0.043 gm. Pt/ml.)+170 ml. of deionized water was added over a 5 minute period. After 10 minutes additional stirring, hydrogen sulfide (343 ml. of deionized water saturated with H₂S at 78° F.) was added slowly. The slurry was stirred an additional 30 minutes prior to drying. The resulting slurry was very thin and light brown in color.

C. Drying, tableting and calcination

The slurry from above was poured into a Pyrex tray and placed in an Aminco (forced air) oven at 110° C. After a few hours it was noted that the drying was not uniform and a hard rubber-like film had formed on the surface. This film could be redispersed in undried portion of slurry; therefore, to make the slurry (probably 40–50% solids) homogeneous, it was placed in a Waring Blendor for about 30 seconds. The drying was then completed at 110° C.

The dry catalyst was ground to pass 20 mesh, mixed with 2% Sterotex and formed as 5/32" tablets. The Sterotex was burned out at 900° F. using 5 parts of air plus 300 parts of N₂ atmosphere; the O₂ content was then slowly increased, and finally the catalyst was calcined 6 hours at 900° F. in straight air.

D. Reduction of catalyst

Before use the platinum of the catalyst is reduced to the metallic state through contact with hydrogen. For instance, the catalyst can be reduced by contact with flowing hydrogen at atmospheric pressure and elevated temperatures, e.g. 900° F.

The following specific examples will serve to illustrate the present invention but are not to be considered limiting:

EXAMPLE I

Twenty grams of a Pt—Al₂O₃ catalyst prepared according to the procedure of applications Serial Nos. 288,058 and 489,726 and containing 0.55% Pt was charged to continuous flow high pressure reactor and diluted with 220 cc. of tabular alumina. Benzene of 99.9+% purity was charged to the reactor at 5.3 hydrocarbon weight hourly space velocity. The reactor was maintained at 200 p.s.i.g., and 10 moles of H₂ per mole of benzene were charged to the reactor. The nominal bed temperature during the reaction was 450° F. and the middle of the bed peaked at 597° F. The product received was cyclohexane of 99.9+% purity as analyzed by mass spectrograph. Analysis for impurities gave the following results:

| Impurity: | Amount |
|---|---|
| Sulfur | 0.002% (20 p.p.m.). |
| Phenol | Less than 40 p.p.m. |
| Thiophene | Less than 0.001%. |
| Benzene | 0.03%. |
| C₇+ aromatics | Trace. |

EXAMPLE II

In run #555–50, 50 grams of Pt—Al₂O₃ catalyst #410G–9041 containing 0.54% platinum and prepared according to the procedure of applications Serial Nos. 288,058 and 489,726 (diluted with 200 cc. of tabular alumina), and ethylbenzene at a hydrocarbon weight hourly space velocity of 0.5 were charged to a continuous flow high pressure reactor. The reactor was maintained at a pressure of 500 p.s.i.g. by passing to it 10 moles of hydrogen per mole of ethylbenzene. A reaction temperature of 375±20° F., was maintained throughout the reaction. The product obtained analyzed 99.6 weight percent ethylcyclohexane and 0.4 weight percent ethylbenzene.

EXAMPLE III

In run #515–63 a feed comprising a selected C₆ fraction which had a boiling range of 151–176° F. and which analyzed

| Component: | Weight percent |
|---|---|
| Methylcyclopentane | 32.4 |
| C₆ cyclic paraffins | 37.9 |
| Benzene | 3.6 |
| C₆ paraffins | 18.3 |
| Dimethylpentanes | 7.9 |
| C₇ cyclic paraffins | 0.4 | was passed to stainless steel reactor containing a bed of Pt—Al₂O₃ catalyst #410–F–9976 which contained 0.6 weight percent platinum and which was prepared according to the procedure of applications Serial Nos. 288,058 and 489,726. The feed was charged at a hydrocarbon weight hourly space velocity of 1.66. Five moles of hydrogen per mole of hydrocarbon feed were passed to the reactor to maintain a pressure of 50 p.s.i.g. The reaction temperature was 950° F. The liquid product from the reactor was stabilized in a glass helices vacuum jacketed glass column with an upper limit of +5° overhead and a maximum pot temperature of 100° C. The stabilized reformate was 78.0 weight percent based on the hydrocarbon feed and contained 80.6 weight percent of benzene. The benzene was separated by fractionation to a high purity product.

EXAMPLE IV

In run #515–61 which was identical to run #515–63 of Example III except that the pressure was 200 p.s.i.g. and the hydrocarbon weight hourly space velocity was 1.64, the weight percent of stabilized reformate recovered was 75.5, and it contained 76.8 weight percent benzene. The benzene was separated in 98 weight percent purity by fractionation.

Benzene was passed to a reactor placed on a radiant heat furnace. The reactor contained 50 grams of a platinum-alumina catalyst #410–G–9041 prepared according to the procedure of applications Serial Nos. 288,058 and 489,726. The catalyst contained 0.54% platinum. The benzene feed was charged at a hydrocarbon weight hourly space velocity of 1.94. Hydrogen was charged to the reactor in the ratio of 10.3 moles of H₂ per mole of benzene feed while maintaining a pressure of 200 p.s.i.g. The reaction temperature peaked at 525° F. during the reaction but the nominal temperature was 315° F. The product from the reactor after stabilization analyzed by weight 98.7% cyclohexane, 1% methylcyclopentane, and 0.3% C₈ naphthenes (run #548–71).

EXAMPLE V

Other experimental runs were made to convert benzene to cyclohexane according to the hydrogenation procedure of Example III. The catalyst was reduced at 900° F. with flowing hydrogen at atmospheric pressure for sixteen hours in runs #548–73 and #548–77. Three of such runs were summarized below:

| | Run #548-73 | Run #548-77 | Run #565-9A |
|---|---|---|---|
| Feed (all runs) | Daiggers benzene, Wt. percent, 98.3%. | Thiophene free benzene. | |
| Catalyst (reduced) | 50 g. #410-G9041 (diluted with 210 cc. of tabular alumina). | 50 g. #410-G9041 (diluted with 210 cc. of tabular alumina). | 35 g. #410-G9041 (diluted logarithmically with 16-20 mesh alumina). |
| Temp., °F.: | | | |
| Nominal | 130 (liquid phase) | 250 (isothermal) | 430. |
| Peak | 480 | | 720. |
| Pressure, p.s.i.g. | 200 | 200 | 500. |
| Hydrocarbon WHSV | 2.0 | 29.1 | 2.1. |
| H$_2$ moles/H'C mole | 10 | 10.3 | 9.5. |
| Product, Wt. Percent: | | | |
| Benzene | | 7.2 | 0.4. |
| Cyclohexane | 99.2 | 90.4 | 97.7. |
| Methylcyclopentane | <0.5 | 1.9 | 1.4. |
| C$_8$ naphthenes | 0.2 | 0.3 | |
| C$_7$ naphthenes and toluene | 0.1 | 0.2 | 0.5. |

This application is a continuation-in-part of my application, Serial No. 428,367, filed May 7, 1954, now abandoned.

It is claimed:

1. A method of hydrogenation which comprises subjecting an unsaturated, hydrogenatable material to contact at hydrogenating conditions with hydrogen and a platinum metal-alumina catalyst comprising calcined alumina and a platinum group metal which catalyst is characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

2. The method of claim 1 in which the platinum metal is platinum.

3. A method for producing cyclohexane by the vapor phase hydrogenation of benzene which comprises subjecting benzene to contact at hydrogenating conditions with hydrogen and a platinum-alumina catalyst, comprising calcined alumina and a platinum group metal which catalyst is characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

4. A method of producing high purity cyclohexane by the vapor phase hydrogenation of benzene which comprises subjecting benzene to contact with hydrogen under hydrogenating conditions including a temperature of about 350° to 700° F. and a pressure of about 100 to 500 p.s.i.a. and a platinum-alumina catalyst comprising calcined alumina and a platinum group metal which catalyst is characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

5. A method for producing ethylcyclohexane by the vapor phase hydrogenation of ethylbenzene which comprises subjecting the ethylbenzene to contact at hydrogenating conditions with hydrogen and a platinum-alumina catalyst comprising calcined alumina and a platinum group metal which catalyst is characterized by a large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

6. The method of claim 5 in which said hydrogenating conditions include a temperature from about 350° to 700° F. and a pressure from about 100 to 500 p.s.i.a.

7. A method of producing cyclohexane which comprises contacting a C$_6$ petroleum hydrocarbon fraction containing a substantial amount of naphthenes with a platinum-alumina catalyst under reforming conditions in the presence of hydrogen to produce a fraction rich in benzene, separating the benzene, subjecting the benzene to contact at vapor phase hydrogenating conditions with hydrogen and a platinum-alumina catalyst to produce cyclohexane, said catalyst in the hydrogenation reaction comprising calcined alumina and a platinum group metal which catalyst is characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

8. A method of producing cyclohexane which comprises contacting a $C_6$ petroleum hydrocarbon fraction containing a substantial amount of naphthenes with a platinum-alumina catalyst under reforming conditions including a temperature from about 875° to 975° F. and a pressure from about 100 to 500 p.s.i.g. in the presence of hydrogen to produce a fraction rich in benzene, separating the benzene, subjecting the benzene to contact with hydrogen under vapor phase hydrogenating conditions including a temperature from about 350° to 700° F. and a pressure from about 100 to 500 p.s.i.a. and a platinum-alumina catalyst to produce cyclohexane, said catalyst in the hydrogenation reaction comprising calcined alumina and a platinum group metal which catalyst is characterized by large pore, high area base structure essentially composed of gamma alumina modifications resulting from the drying and calcination of a mixture of precursor hydrous alumina phases containing from about 65% to about 95% of trihydrate, said catalyst containing from about 0.1% to about 1% by weight of a platinum metal, said platinum metal being present in sufficiently finely divided form as to exhibit, by X-ray diffraction studies, the substantial absence of crystallites and crystals of size larger than 50 angstrom units, said catalyst after calcining and before use having an area (BET method) of from about 350 to about 550 square meters per gram and having about 0.1 to about 0.5 cubic centimeter per gram of pore volume in the pore size range of about 100 to 1000 angstrom units.

9. The method of claim 8 in which the reforming is conducted at pressure at least as great as the pressure of the hydrogenation reaction and in which hydrogen from the reforming reaction is passed to the hydrogenation reaction.

10. The method of claim 1 wherein the unsaturated, hydrogenatable material is aromatic.

11. The method of claim 1 wherein the unsaturated, hydrogenatable material is selected from the group consisting of benzene and ethyl benzene.

References Cited in the file of this patent

UNITED STATES PATENTS

| | | |
|---|---|---|
| 2,331,292 | Archibald et al. | Oct. 12, 1943 |
| 2,456,633 | Haensel | Dec. 21, 1948 |
| 2,636,865 | Kimberlin | Apr. 28, 1953 |
| 2,662,861 | Riblett et al. | Dec. 15, 1953 |
| 2,689,226 | Hoekstra | Sept. 14, 1954 |
| 2,698,305 | Plank et al. | Dec. 28, 1954 |
| 2,757,128 | Hemminger | July 31, 1956 |
| 2,768,125 | Ashley et al. | Oct. 23, 1956 |